United States Patent [19]

Klein

[11] 3,988,302

[45] Oct. 26, 1976

[54] POLYURETHANES PREPARED BY REACTION OF ORGANIC POLYISOCYANATE WITH BROMINATED ESTER-CONTAINING POLYOLS

[75] Inventor: Howard Paul Klein, Austin, Tex.

[73] Assignee: Texaco Development Corporation, New York, N.Y.

[22] Filed: May 24, 1974

[21] Appl. No.: 472,999

[52] U.S. Cl. .................... 260/77.5 AR; 260/2.5 AR
[51] Int. Cl.² ......................................... C08G 18/38
[58] Field of Search ............... 260/77.5 AP, 2.5 AP, 260/77.5 AN, 77.5 AR, 2.5 AR

[56] References Cited

UNITED STATES PATENTS 3,391,092   7/1968   Wonsley et al. ............. 260/77.5 AP Primary Examiner—M. J. Welsh
Attorney, Agent, or Firm—James L. Bailey; John R. Kirk, Jr.; Lee G. Meyer

[57] ABSTRACT

Brominated ester-containing polyether polyols are prepared by the sequential reaction of a polyether polyol with 4,5-dibromohexahydrophthalic anhydride or its corresponding diacid and an alkylene oxide. The resulting polyols are particularly useful in the preparation of flame-retardant polyurethane foams.

5 Claims, No Drawings

POLYURETHANES PREPARED BY REACTION OF ORGANIC POLYISOCYANATE WITH BROMINATED ESTER-CONTAINING POLYOLS

BACKGROUND OF THE INVENTION

1. Field of the Invention

The present invention relates to ester-containing polyether polyols and to the use thereof in the preparation of urethane compositions. More particularly, the invention relates to ester-containing polyether polyols having bromine atoms chemically bound therein and to the use thereof in the preparation of flame-retardant polyurethane foams.

2. Description of the Prior Art

It has become increasingly important to impart flame-resistant properties to polyurethane plastics. This is particularly true where cellular polyurethanes are used, for example, as insulation, and to prevent the risk of fire in the daily use of other items. Numerous methods are known for imparting fire-resistant properties to polyurethane plastics. For example, in the production of the cellular polyurethanes, one may use halogenated compounds or derivatives of acids of phosphorus as the active hydrogen-containing component, and thus impart flame-resistance. It is also possible to use compounds of antimony or boron.

Certain ester-containing polyols having halogens atoms chemically bound therein have also been demonstrated to be effective as fire-retardants in polyurethane compositions. For example, U.S. Pat. No. 3,585,185, there are disclosed ester-containing polyols prepared by the reaction of alkylene oxide adducts of organic compounds having at least two active hydrogen atoms with a halogen-containing organic acid anhydride and an alkylene oxide. However, these halogen-containing polyols require relatively high percentages of halogen in order to be effective.

It is an object of the present invention to provide brominated ester-containing polyether polyols which impart flame-resistant properties to polyurethane compositions at relatively low bromine concentrations. It is a further object of the present invention to provide polyurethane compositions useful in the preparation of foams, adhesives, binders, laminates and coatings. These, and other objects of the present invention, will be apparent from the specification and examples which follow.

SUMMARY OF THE INVENTION

It has been found that brominated ester-containing polyether polyols prepared by the sequential reaction of a polyether polyol with 4,5-dibromohexahydrophthalic anhydride and an alkylene oxide impart a higher degree of flame-resistance to polyurethane foams prepared therefrom at relatively low bromine concentrations.

DESCRIPTION OF THE PREFERRED EMBODIMENTS

There are three essential reactants employed in the preparation of the brominated ester-containing polyether polyols of the present invention, namely a polyether polyol, 4,5-dibromohexahydrophthalic anhydride or its corresponding diacid, and an alkylene oxide.

The polyether polyols employed in the preparation of the brominated ester-containing polyether polyols of the present invention are well-known in the art as evidenced by U.S. Pat. Nos. 1,922,459; 3,190,927; and 3,346,557. They are generally prepared by the catalytic addition of an alkylene oxide or mixture of alkylene oxides either simultaneously or sequentially with an organic compound having at least two active hydrogen atoms. Representative organic compounds include polyhydric alcohols such as ethylene glycol, propylene glycol, the isomeric butylene glycols, 1,5-pentane diol, 1,6-hexane diol, glycerol, trimethylolpropane, 1,2,6-hexane triol, sorbitol, sucrose, alphamethyl glycoside and pentaerythritol; organic acids or anhydrides such as adipic acid, succinic acid, aconitic acid and trimellitic acid and anhydrides; and phenolic compounds such as bisphenol, pyrogallol, resorcinol, inositol. The polyhydric alcohols are preferred in preparing the polyether polyol precursors of the compounds of this invention and especially preferred are the aliphatic glycols. Mixtures of any of the above may also be employed.

Also useful in the practice of this invention are certain phosphorus-containing polyether polyols. The preferred phosphorus-containing polyols are those produced by the reaction of an alkylene oxide having two to four carbon atoms, for example, ethylene oxide, propylene oxide and the isomers of butylene oxide with phosphorus acids and esters thereof having reactive OH groups. There are many of these materials available to those skilled in the art. For example, many reactive phosphorus-containing polyols useful for the practice of my invention are described in U.S. Pat. No. 3,251,785. Especially useful is a phosphorus-containing polyol sold under the trademark of Vircol 82 which contains two reactive hydroxyl groups. Other useful phosphorus-containing polyols are produced by reacting a lower alkylene glycol such as ethylene glycol, propylene glycol and the like with a phosphoric acid, particularly polyphosphoric acid, to form an ester and then propoxylating the resulting ester until it is a substantially neutral compound. Monohydric alcohols such as butyl alcohol, isobutyl alcohol and higher alcohols having preferably up to eight carbon atoms or a mono lower alkyl glycol ether such as ethylene glycol monomethyl ether, propylene glycol monomethyl ether, ethylene glycol monoethyl ether, ethylene glycol monopropyl ether, ethylene glycol monobutyl ether, and the like reacted with phosphoric acids, particularly polyphosphoric acid, are alkoxylated preferably with propylene oxide, to form useful phosphorus-containing polyols. Such phosphorus-containing polyols may be used alone or in combination with the organic polyether polyols previously described.

Alkylene oxides which may be employed in the preparation of the polyether polyols which are precursors of the compounds of the present invention include ethylene oxide, propylene oxide, the isomeric normal butylene oxides, hexylene oxide, octylene oxide, dodecene oxide, methoxy and other alkoxy propylene oxides, styrene oxide and cyclohexene oxide. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro-1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

Generally, the polyether polyols useful in the present invention will have a molecular weight between 190 and 10,000. The preferred polyether polyols useful in the practice of this invention are the polyether diols prepared by addition of propylene oxide to a glycol selected from the group of ethylene glycol, propylene glycol, butylene glycol, 1,5-pentane diol and 1,6-hexane diol and having a molecular weight of from about 300 to about 6,000; the polyether triols prepared by addition of propylene oxide and ethylene oxide to trimethylolpropane or glycerol, said polyether triol having a molecular weight of from about 500 to about 10,000; and phosphorus-containing polyether polyols such as those described in U.S. Pat. No. 3,251,785.

The brominated ester-containing polyether polyols of the present invention are prepared by initially reacting 4,5-dibromohexahydrophthalic anhydride or its corresponding diacid, 4,5-dibromohexanhydrophthalic acid with the polyether polyol herein described to form the corresponding half-ester of the acid. Thereafter, the half-ester itself is reacted with alkylene oxide to esterify the other carboxyl group and form the product polyol.

The reaction between the acid anhydride and the polyether polyol is generally carried out at a temperature of from about 50° C. with a temperature of from about 75° C. to about 125° C. being preferred. Temperatures below about 150° C. must be maintained to prevent the reaction of carboxyl and hydroxyl groups with the formation of water. The reaction is generally carried out at a pressure of from about 0 to about 100 psig.

The reaction time required to form the half-ester will depend upon the temperature selected and the particular polyether polyol. Although a catalyst is not required in order to effect the reaction, well-known basic catalysts, e.g., sodium acetate, are generally employed in order to speed the reaction. Typical reaction times whenever such basic catalysts are employed are generally from about 0.5 to about 5 hours.

The ratio of the acid anhydride reactant to the polyether polyol will depend upon the level of bromine desired in the product polyol. Whenever the polyether polyol is a diol, a molar ratio of acid anhydride to diol of up to 2:1 may be employed. Similarly, when polyether polyol is a triol, a molar ratio of acid anhydride to triol of up to 3:1 may be employed and so forth. However, it has been found that effective fire-retardance is obtained in the product polyols at much lower bromine concentrations than the aforementioned maximum ratios. Therefore, it is preferable to employ the 4,5-dibromohexahydrophthalic anhydride in an amount of from about 0.75 to about 1.5 moles of anhydride per mole of polyether polyol. An especially preferred amount is a mole ratio of acid anhydride to polyether polyol of approximately 1:1.

The reaction between the acid anhydride and the polyether polyol is continued until essentially all of the acid anhydride has been reacted and the resulting reaction mixture is substantially free of the acid anhydride. Thereafter, the half-ester is reacted with an alkylene oxide to esterify the remaining carboxyl groups.

Alkylene oxides which may be employed in the esterification of the half-ester include any of the alkylene oxides mentioned previously which are suitable in the formation of the polyether polyols which are useful in the practice of this invention. The esterification of the half-ester is generally carried out at a temperature of from about 50° C. to about 150° C., with a temperature of from about 75° C. to about 125° C. being preferred. The pressure at which the esterification is carried out is generally in the range of from about 0 to about 100 psig. Although a catalyst is not required in order to effect the esterification of the half-ester, a catalyst is, nevertheless, generally employed in order to speed up the reaction. Suitable catalysts well-known to those in the art include, for example, lithium chloride.

The alkylene oxide is employed in an amount of at least 1 mole of alkylene oxide per mole of carboxyl group to be esterified. Generally, however, a greater amount is employed, with the excess being removed from the reaction mixture after the esterification is completed. The esterification reaction is continued until the acid number of the mixture is quite low, generally less than about 10, and preferably the reaction is continued until an acid number of less than 1.0 mg. KOH per gram of mixture is attained. The hydroxyl number of the ester-containing polyether polyol will vary considerably. Generally, however, the brominated polyols will have a hydroxyl number of from about 20 to about 600 and perferably from about 25 to about 500.

Whenever the polyether polyol to be employed in the practice of this invention is derived from a polyhydric alcohol precursor, it is within the scope of the instant invention to react the 4,5-dibromohexahydrophthalic anhydride with the polyhydric alcohol precursor and thereafter react the half-ester with alkylene oxide in an amount to yield the desired number of ether linkages in the final ester-containing polyether polyol product as well as reduce the acid number of the product to the desired level.

In a preferred embodiment of the present invention, the foregoing brominated ester-containing polyether polyols are employed in the preparation of polyurethane compositions, particularly polyurethane foams. The resulting polyurethane products exhibit marked improvement in flame-retardant properties without impairment of the other physical properties of the products. The polyurethane products are generally prepared by the reaction of the brominated ester-containing polyether polyol with an organic polyisocyanate optionally in the presence of additional polyhydroxyl-containing components, chair extending agents, catalysts, surface active agents, foam stabilizers, blowing agents, fillers, and pigments.

The organic polyisocyanates useful in the production of polyurethanes are well-known and are a matter of selection by those skilled in the polyurethane art. Examples of such organic polyisocyanates include aromatic or aliphatic polyisocyanates such as diphenyl-4,6,4'-triisocyanate, 3,3'-dichloro-4,4-diphenyldiisocyanate, diphenyldiisocyanate, octamethylene diisocyanate, 1,4-tetramethylene diisocyanate, meta- and paraphenylenediisocyanate, xylene-1,4-diisocyanate, xylene-1,3-diisocyanate, naphthalene-1,4-diisocyanate, 2,4- and 2,6-toluene diisocyanates, diphenylmethane diisocyanate, paraisocyanatobenzyl isocyanate, polymethylene polyphenyl isocyanates, etc., and mixtures thereof.

Foam stabilizers are also well-known. Some commonly used foam stabilizers are organic silanes or siloxanes, usually silicone glycol copolymers. Such materials may be those having the general formula R'Si[O-(R$_2$SiO)$_n$ - (oxyalkylene)$_m$R'']$_3$ wherein R, R' and R'' are alkyl groups containing 1 to 4 carbon atoms, $n$ is 4–8, $m$ is 20–40, and the oxyalkylene groups are derived from ethylene oxide or propylene oxide or both.

The use of nonreactive blowing agents in the preparation of urethane foams is well-known. Such blowing agents are generally volatile such as, for example, methylene chloride, pentane, and fluorocarbons. The blowing of foam is sometimes accomplished by using a small amount of water and an excess of polyisocyanate. Water reacts with the isocyanate, generating carbon dioxide which acts as the blowing agent.

Catalysts that may be used alone or in admixture include, for example, tertiary amines such as triethylenediamine, 2-methyltriethylenediamine, N-methylmorpholine, N-ethylmorpholine, triethylamine, trimethylamine, etc., and mixtures thereof. Also, organo metallic compounds such as organic tin compounds may be used such as, for example, stannous octoate, stannous oleate, stannous laurate, dibutyltin di-2-ethylhexoate, dibutyltin dibutoxide, and dibutyltin dilaurate. The corresponding lead, zinc and iron compounds have also been suggested for this use.

As mentioned above, the ester-containing polyol may be employed as the sole polyhydroxyl-containing component or it may be employed along with the polyhydroxyl-containing components commonly employed in the art. Representative of these components are hydroxyl-containing polyesters, polyalkylene polyether polyols, hydroxy terminated polyurethane polymers, polyhydric polythioethers, polyhydroxyl-containing phosphorus compounds, polyacetals, aliphatic polyols, and aliphatic thiols including alkane, alkene and alkyne thiols having 2 or more SH groups. Compounds which contain 2 or more different groups within the above-defined classes may also be used.

Along with the fire-retardant brominated ester-containing polyether polyols of the present invention, conventional fire retardants may also be employed in the preparation of the polyurethane compositions of the present invention. These conventional fire retardants may be of two types. The first of these are those that are incorporated by mere mechanical mixing and include, for example, tris(chloroethyl) phosphate, tris(2,3-dibromopropyl) phosphate, diammonium phosphate, halogenated compounds and antimony oxide. The second type of fire retardants are those that become chemically bound in the polymer chain. An example of this type of fire retardant includes chlorendic acid derivatives.

The invention will be further illustrated with reference to the following specific examples which are given by way of illustration, rather than by way of limitation on the scope of this invention.

EXAMPLE I

To a 500 ml. round-bottom 3-neck flask was added 76 g. (0.5 mole) of cis-4-cyclohexene-1,2-dicarboxylic anhydride, and 300 ml. of acetic acid. The mixture was cooled to 5°–10° C. and 80 g. (0.5 mole) of bromine was added drip-wise. The resulting mixture was filtered and the product was washed with normal heptane. There was produced 116 g. of a solid material with a melting point of 134°–137° C. This represents a yield of 74.4%. The NMR spectrum of the above product confirmed its structure as that of 4,5-dibromocyclohexane-1,2-dicarboxylic anhydride (also known as 4,5-dibromohexahydrophthalic anhydride). The carbon-hydrogen analysis is in agreement with the molecular formula for the above compound with

|              | Theoretical | Experimental |
|--------------|-------------|--------------|
| % Carbon     | 30.8        | 30.67        |
| % Hydrogen   | 2.56        | 2.55         |

The infra-red spectrum confirms the structure as that of the dibromide.

EXAMPLE II

To a reaction vessel equipped with a stirrer, thermometer, nitrogen source, and feed exchange means was charged 104 g. (0.333 mole) of trans-4,5-dibromohexahydrophthalic anhydride, 1,000 g. (approximately 0.333 mole) of a 3,000 molecular weight polyol prepared by reacting a mixture of propylene oxide and ethylene oxide with trimethylolpropane (OH number approximately = 50), and 0.2 g. of sodium acetate. The vessel was then purged with nitrogen and heated to 80°–90° C. for one hour with stirring. After this time, the mixture was a clear, water-white material. An infrared spectrum indicated that the material was the expected half-ester acid and that no excess anhydride remained. Then, 0.2 g. of lithium chloride was added to the reaction vessel and the material heated at 95°–100° C. while approximately 100 g. of ethylene oxide was bubbled through the mixture. All ethylene oxide vapors emanating from the reaction vessel during the course of the reaction were condensed with the aid of a dry ice condenser and returned to the reaction vessel. After about 5 hours, the acid number of the material in the reaction vessel had dropped to 0.08. At that time, the product was stripped of volatiles by heating at 100° C. for one hour and at a pressure of 1 mm. mercury. The product had the following properties: hydroxyl number — 44.6; acid number — 0.08; bromine — 4.1%

EXAMPLE III

A polyurethane foam was prepared using 100 parts of the brominated polyol prepared by the procedure of Example II and 52 parts of toluene diisocyanate (an 80/20 mixture of 2,4- and 2,6-isomers), 4.4 parts of water, 1 part silicone surfactant, 0.8 part of stannous octoate (50% N-dioctylphthalate), and 0.1 part of an amine catalyst (THANCAT DD-Jefferson Chemical Company, Inc.). A flexible foam having superior flame-retardant properties was obtained. The foam had a burn rate (ASTM-D-1692-67T) that was 75% less than a foam prepared as above with the exception that the ester-containing polyol contained no bromine, and 64% less than a foam containing twice as much bromine, prepared with a brominated polyol wherein the bromine source was tetrabromophthalic anhydride.

EXAMPLE IV

To a reaction vessel, as in Example II, was added 78 g. (0.25 mole) of trans-4,5-dibromohexahydrophthalic anhydride, 100 g. (approximately 0.25 mole) of a polypropylene glycol of 400 molecular weight and 1.0 g. of sodium acetate. The vessel was purged with nitrogen and heated to 80°–90° C. for one hour with stirring. Then the material was heated at 95°–100° C. while approximately 29 g. of propylene oxide was bubbled through the mixture and kept in the flask with the aid of a dry ice condenser until it had reacted. After about 3 hours, the product was stripped of volatiles by heating at 100° C. under vacuum. The product was a hazy, off-white viscous liquid having the following properties: hydroxyl number — 127; acid number — 0.42; wt.% bromine —18.1.

EXAMPLE V

To a reaction vessel, as in Example II, was added 78 g. (0.25 mole) of trans-4,5-dibromohexahydrophthalic anhydride, 0.5 g. sodium acetate and 375 g. (about 0.25 mole) of a 1,500 molecular weight polyol prepared by reacting ethylene oxide and propylene oxide with trimethylolpropane (hydroxyl number of approximately 112 with about 50–60% primary hydroxyl). The vessel was purged with nitrogen and heated to 80° C. for one hour with stirring. After this time the material was clear and water-white. Then 0.25 g. of lithium chloride was added and the mixture was heated at approximately 100° C. while 30 g. of ethylene oxide was added. The ethylene oxide was kept in the flask with the aid of a dry ice condenser. After the ethylene oxide had reacted, the acid number of the mixture was found to be <0.1 mg. KOH/g. The product was then vaccum stripped and filtered to yield a clear, yellow viscous liquid having the following properties: hydroxyl number — 99.6; acid number — 0.04; wt.% bromine — 7.34.

EXAMPLE VI

To a reaction vessel as in Example II was added 156 g. (0.5 mole) of 4,5-dibromohexahydrophthalic anhydride, 0.3 g. of sodium acetate and 2,250 g. (0.5 mole) of a 4,500 molecular weight triol prepared by reacting ethylene oxide and propylene oxide with trimethylolpropane (hydroxyl number of about 35–40 with about 70–80% primary hydroxyl). The vessel was purged with nitrogen and heated to 80° C. for about one hour with stirring. At this time, the material was a light yellow, clear liquid which, by IR spectrum, proved to be the half-ester of the acid. Then the mixture was heated to approximately 95°–100° C. and 70 g. of ethylene oxide was bubbled through the mixture over a five hour period. Then approximately 75 g. of propylene oxide was bubbled through the mixture for two hours at 95°–100° C. and the acid number of the mixture was reduced to 0.22. The product was vacuum stripped and the final product had the following properties: hydroxyl number — 31.5; wt.% bromine — 3.11.

EXAMPLE VII

To a reaction vessel, as in Example II, was added 110 g. (0.353 mole) of 4,5-dibromohexahydrophthalic anhydride, 0.2 g. sodium acetate and 1,000 g. of a 1,100 molecular weight polyol prepared by reacting propylene oxide with sucrose (hydroxyl number of about 485). The vessel was purged with nitrogen and heated to 80° C. for about 2 hours with stirring. The resulting light yellow, clear, viscous liquid, having an acid number of approximately 50, was then heated to 100°–105° C. and about 40 g. of ethylene oxide was bubbled through the mixture and allowed to react over a period of about four hours. The product was a clear, yellow, viscous liquid having the following properties: hydroxyl number — 434; acid number — 0.12; wt.% bromine — 1.94.

EXAMPLE VIII

A polyurethane foam was prepared using 41.3 parts by weight of the brominated polyol of Example VII, 44.7 parts of polymethylene polyphenylisocyanate (1.05 index), 0.5 part silicone surfactant, 0.5 part N,N-dimethylethanolamine, 0.5 part triethylenediamine (Dabco LV-33, Houdry Process & Chemical Company) and 12.5 parts of fluorocarbon R-11-B (Kaiser). The foam had a burn rate (ASTM D-1692-67T) that was only 82% of that of a similar foam containing no bromine.

EXAMPLE IX

A polyurethane foam was prepared using 41.1 parts of a polyol blend containing 80% of the polyol of Example VII and 20% of Fyrol 6 fire-retardant polyol (Stauffer Chemical Company), 44.9 parts of polymethylene polyphenylisocyanate (1.05 index), 0.5 part silicone surfactant, 0.5 part N,N-dimethylethanolamine, 0.5 part triethylenediamine (Dabco LV-33)and 12.5 parts of R-11-B. The foam when subjected to a burn test (ASTM 1692) burned 1.18 inches in 33.6 seconds at which time it self-extinguished. A similar foam prepared from 80% of a polyol prepared by reacting propylene oxide with sucrose (hydroxyl number of about 485) and 20% Fyrol 6 burned 1.40 inches in 36.8 seconds before self-extinguishing.

EXAMPLE X

To a reaction vessel, as in Example II, was added 199 g. (0.638 mole) of 4,5-dibromohexahydrophthalic anhydride, 0.5 g. sodium acetate and 400 g. (0.717 mole) of a propoxylated phosphoric acid polyol, having a hydroxyl number of 201 and phosphorus content of 11.3 percent (Vircol 82, Mobil Chemical Co.). The resulting mixture was stirred under nitrogen and heated at 80° C. for 2 hours until a clear, homogeneous solution resulted. Then, 0.4 g. of lithium chloride was added and the mixture heated at 95°–100° C. while 55 g. (1.25 mole) ethylene oxide was added. After a short digestion period the reaction mixture was vacuum stripped at 95° C. The resulting product was a homogeneous viscous liquid of light color having the following properties: hydroxyl number — 96.4; acid number — 0.18; wt.% phosphorus — 6.66; wt.% bromine — 23.9.

EXAMPLE XI

A polyurethane foam was prepared using 13.35 parts of the brominated polyol of Example X, 31.15 parts of a sucrose based polyol with hydroxyl number of 465, 0.5 parts of silicone surfactant, 0.5 parts of tetramethylpropanediamine, 15.0 parts fluorocarbon R-11B (Kaiser) and 39.5 parts of polymethylene polyphenylisocyanate (THANATE P-270, Jefferson Chemical Co.). The foam had a burn rate of 1.57 inches in 33.6 seconds according to the ASTM D-1692-67T test. A similar foam containing solely the sucrose polyol with no added brominated polyol had a burn rate of 4.8ᶠ inches per minute by the same test.

From the foregoing description and Examples of this invention, those of ordinary skill in the art may make many modifications and variations therefrom without departing from the scope of the invention as hereinafter claimed.

I claim:

1. A polyurethane composition prepared by reacting an organic polyisocyanate with a brominated ester-containing polyether polyol wherein said brominated ester-containing polyether polyol is prepared by reaction of an alkylene oxide selected from the group consisting of ethylene oxide, propylene oxide, butylene oxide, epichlorohydrin and mixtures thereof and a half-ester in a ratio of said oxide to said half-ester such that said oxide is present in an amount sufficient to reduce the acid number of said brominated ester-containing polyether polyol to 10 ml KOH/g or less and, wherein said half-ester is formed by the reaction of
  a. a polyether polyol prepared by the addition of an alkylene oxide selected from the group consisting of ethylene oxide, propylene oxide and mixtures thereof to a polyhydric compound selected from the group consisting of ethylene glycol, propylene glycol, the isomeric n-butylene glycols, 1,5-pentanediol, 1,6-hexanediol, glycerol, trimethylolpropane, 1,2,6-hexanetriol, sorbitol, sucrose, alpha-methyl glycoside, pentaerythritol, phosphorus acids and phosphorus acid esters having at least one reactive OH, and
  b. 4,5-dibromohexahydrophthalic anhydride or its corresponding acid, wherein the mole ratio of polyether polyol (a) to 4,5-dibromohexahydrophthalic anhydride or its corresponding acid (b) is from 2:3 to about 3:1.

2. The polyurethane composition of claim 1 wherein the polyether polyol is prepared by the addition of propylene oxide to a glycol selected from the group of ethylene glycol, propylene glycol, butylene glycol, 1,5-pentanediol and 1,6-hexanediol, said polyol having a molecular weight from about 300 to about 6,000.

3. The polyurethane composition of claim 1 wherein the polyether polyol is prepared by the addition of a mixture of propylene oxide and ethylene oxide to trimethylolpropane, said polyol having a molecular weight of from about 500 to about 10,000.

4. The polyurethane composition of claim 1 wherein the polyether polyol is prepared by the addition of a mixture of propylene oxide and ethylene oxide to glycerol, said polyol having a molecular weight of from about 500 to about 10,000.

5. The polyurethane composition of claim 1 wherein the polyether polyol is prepared by the addition of a mixture of propylene oxide and ethylene oxide to phosphoric acid.

\* \* \* \* \*